US012707452B2

(12) United States Patent
Vig et al.

(10) Patent No.: US 12,707,452 B2
(45) Date of Patent: Aug. 11, 2026

(54) DYNAMIC LINK MANAGEMENT IN MULTI-LINK OPERATION FOR MESH NETWORK

(71) Applicant: MediaTek Singapore Pte. Ltd., Singapore (SG)

(72) Inventors: Prakhar Vig, Noida (IN); Amit Shakya, Noida (IN)

(73) Assignee: MediaTek Singapore Pte. Ltd., Singapore (SG)

( * ) Notice: Subject to any disclaimer, the term of this patent is extended or adjusted under 35 U.S.C. 154(b) by 315 days.

(21) Appl. No.: 18/227,989

(22) Filed: Jul. 31, 2023

(65) Prior Publication Data

US 2024/0049217 A1 Feb. 8, 2024

(30) Foreign Application Priority Data

Aug. 3, 2022 (IN) ............................ 202221044471

(51) Int. Cl.
*H04W 76/15* (2018.01)
*H04W 72/1263* (2023.01)
*H04W 72/542* (2023.01)
*H04W 72/566* (2023.01)
*H04W 84/18* (2009.01)

(52) U.S. Cl.
CPC ..... *H04W 72/1263* (2013.01); *H04W 72/542* (2023.01); *H04W 72/569* (2023.01); *H04W 76/15* (2018.02); *H04W 84/18* (2013.01)

(58) Field of Classification Search
CPC ........... H04W 28/0284; H04W 28/082; H04W 60/04; H04W 72/569; H04W 72/1263; H04W 76/10; H04W 76/15; H04W 88/10
USPC ........................................ 370/328, 329, 338
See application file for complete search history.

(56) References Cited

U.S. PATENT DOCUMENTS

2023/0156840 A1* 5/2023 Chitrakar .............. H04W 76/15 370/329
2023/0254732 A1* 8/2023 Kneckt ............ H04W 28/0284 370/229
2023/0319925 A1* 10/2023 Montemurro ......... H04W 76/15 370/329

FOREIGN PATENT DOCUMENTS

WO WO-2023239534 A1 * 12/2023 ........... H04W 76/15

* cited by examiner

*Primary Examiner* — Harun Chowdhury
(74) *Attorney, Agent, or Firm* — Winston Hsu

(57) ABSTRACT

A multi-link operation (MLO) controller for a mesh network includes: a processing unit, including: establishing a multi-link connection with a first non-access (AP) point MLO device within the mesh network according to an initial traffic identifier (TID) to link mapping and a channel list, wherein the multi-link connection includes an associated link containing information of all other links, and priority traffic is sent on a better or best affiliated link configured by a TID to link mapping; configuring a plurality of thresholds for a respective plurality of operating parameters of the multi-links; when one of the operating parameters changes with respect to the configured threshold, disabling traffic on the corresponding link; and performing traffic distribution according to updated operating parameters and updating the TID to link mapping for the multi-link connection.

16 Claims, 10 Drawing Sheets

Figure 4C:
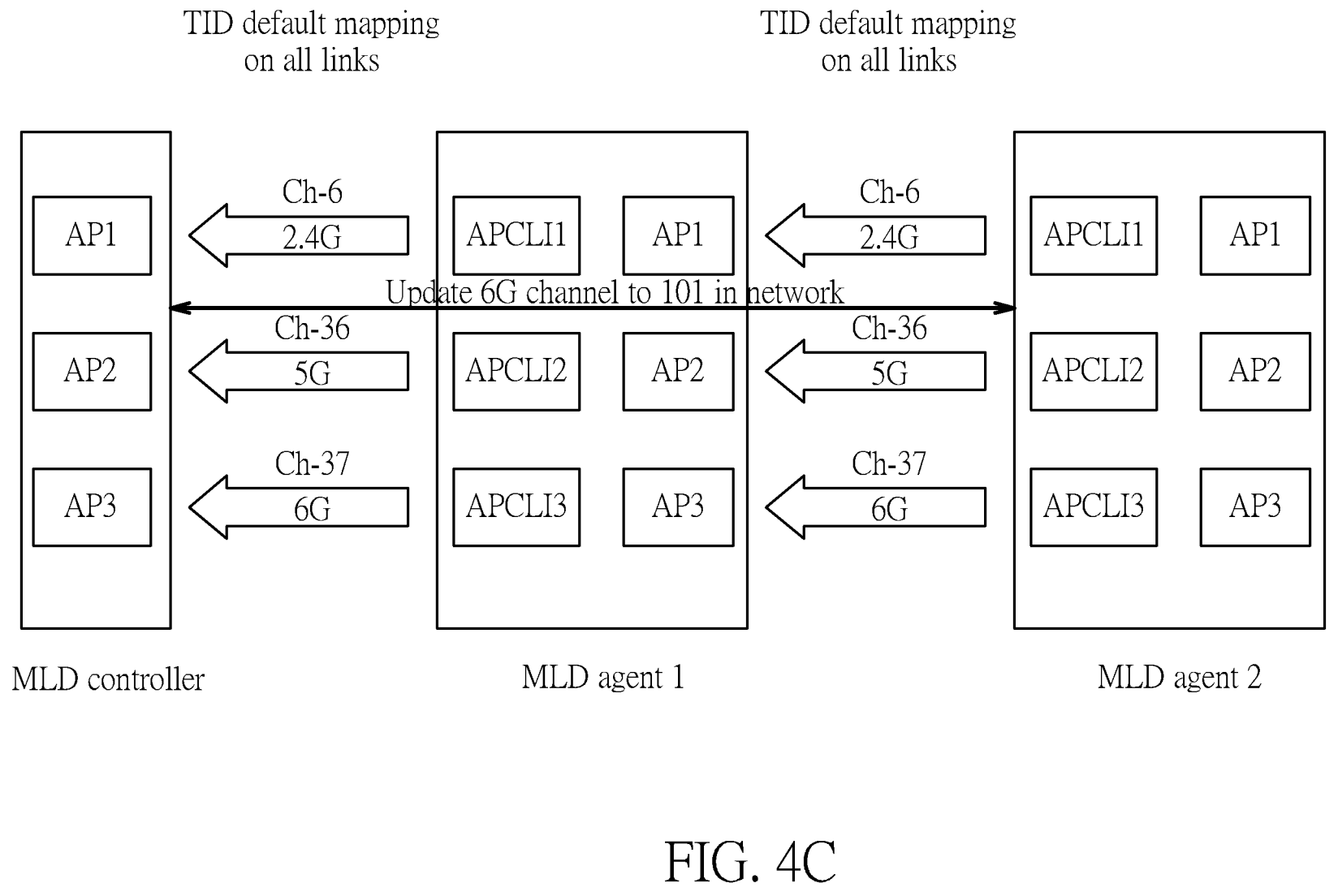

TID default mapping on all links

TID default mapping on all links

Ch-6 2.4G

Ch-36 5G

Ch-37 6G

Update 6G channel to 101 in network

MLD controller

AP1

AP2

AP3

MLD agent 1

APCLI1

AP1

APCLI2

AP2

APCLI3

AP3

MLD agent 2

APCLI1

AP1

APCLI2

AP2

APCLI3

DYNAMIC LINK MANAGEMENT IN MULTI-LINK OPERATION FOR MESH NETWORK

BACKGROUND

Multi-Link Operation (MLO) allows devices connected to a Wi-Fi Access Point (AP) in a mesh network to couple over multiple Wi-Fi bands simultaneously, thus allowing traffic to be sent over more than one link at the same time. This reduces traffic congestion and increases data transfer speeds and throughput. The Wi-Fi AP acts as a controller for the mesh network, and can configure other devices as agents. The multi-links may comprise frequency bands of 2.4 GHz, 5 GHz and 6 GHz, wherein priority traffic is typically sent over the highest frequency band. The mesh network operates on a number of fixed channels wherein all devices connected within the mesh network support those channels.

Communication over different channels and frequency bands can cause problems, as each channel and frequency band will have different properties and performance; these may further vary due to changes in environmental conditions. A sub-optimal link may be defined as one which has low Received Signal Strength Indicator (RSSI) or range, which will lead to decreased throughput. In addition, performance of an associated frequency band may degrade if there is channel overloading due to traffic from other devices which are present in the environment but not part of the mesh network. Finally, placement of a device within a particular environment can affect the coverage; in particular, for high frequency links, wherein even if the rate is good, the link may still be sub-optimal for this particular scenario.

SUMMARY

The invention therefore provides a method for a controller within a mesh network which employs a Multi-Link Operation scheme that can re-distribute traffic when one or more links become sub-optimal.

A multi-link operation (MLO) controller for a mesh network comprises: a processing unit, for controlling operations of the mesh network. The processing unit comprises: establishing a multi-link connection with at least a first non-access (AP) point MLO device within the mesh network according to an initial traffic identifier (TID) to link mapping and a channel list, wherein the multi-link connection includes an associated link containing information of all other links, and priority traffic is sent on a better affiliated link configured by the TID to link mapping; configuring a plurality of thresholds for a respective plurality of operating parameters of the multi-links; when at least one of the operating parameters changes with respect to the configured threshold, disabling traffic on the corresponding link; and performing traffic distribution according to updated operating parameters and updating a TID to link mapping for the multi-link connection. The MLO controller further comprises a communications unit, for transmitting the configured thresholds to the first non-AP MLO device, receiving a notification from the first non-AP MLO device when the operating parameter changes, and sending the updated TID to link mapping to the first non-AP MLO device.

A multi-link operation (MLO) method for an MLO controller within a mesh network comprises: establishing a multi-link connection with at least a first non-access (AP) point MLO device within the mesh network according to an initial traffic identifier (TID) to link mapping and a channel list, wherein the multi-link connection includes an associated link containing information of all other links, and priority traffic is sent on a better affiliated link configured by the TID to link mapping; configuring a plurality of thresholds for a respective plurality of operating parameters of the multi-links; when at least one of the operating parameters changes with respect to the configured threshold, disabling traffic on the corresponding link; and performing traffic distribution according to updated operating parameters and updating a TID to link mapping for the multi-link connection.

When the operating parameter is received signal strength interference (RSSI) and the RSSI goes below the configured threshold, a priority of all links is determined according to updated PER and Link Rate of the multi-links, and priority traffic is directed to the highest priority link. When the RSSI of the disabled link equals or goes above the configured threshold, low priority traffic is mapped to the disabled link for evaluation. When the disabled link is determined to be optimal, the link is enabled and the TID to link mapping is updated.

When the operating parameter is channel overload (CU), and when the CU for a specific link of the multi-links goes above the configured threshold, scanning is triggered on the specific link, comprising: diverting traffic to the other links; initiating scanning on the specific link; according to scan results, determining a better channel; and directing priority traffic to a better channel.

The multi-links comprise a 6 GHz frequency band, a 5 GHz frequency band and a 2.4 GHz frequency band, wherein priority traffic is sent on the 6 GHz frequency band.

The mesh network further comprises a second non-AP MLO agent and the MLO controller is configured to transmit data and instructions to the second non-AP MLO agent via the first non-AP MLO agent.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4C is a diagram of a third step of a method according to the third embodiment of the present invention.

DETAILED DESCRIPTION

The present invention provides a number of methods for a controller to re-direct traffic when an MLO affiliated link becomes sub-optimal.

Figure 1:
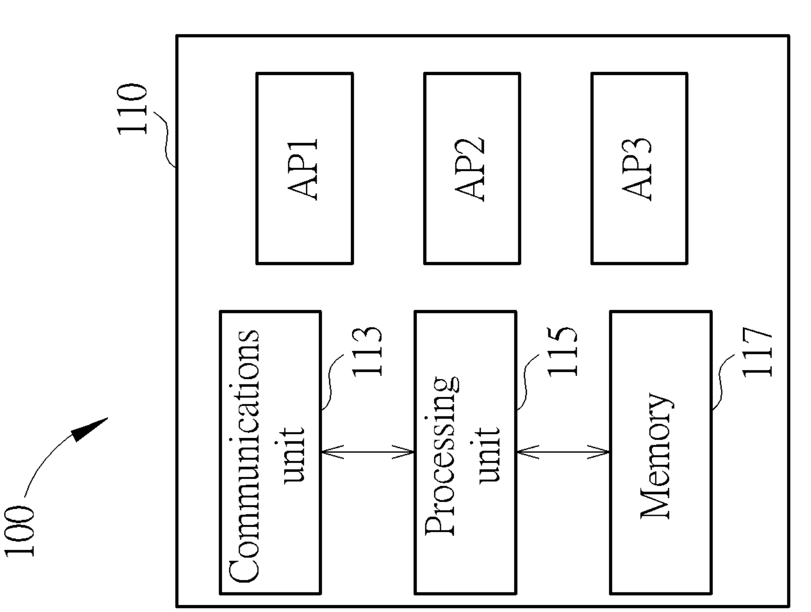
FIG. 1 is an illustration of a controller and an agent within a mesh network according to an embodiment of the present invention.

Refer to FIG. 1, which illustrates an initial setup over several links in a mesh network 100 between a controller 110 and an agent 120 according to an embodiment of the present invention. The controller 110 controls the whole network 100 and is used to configure any connected devices within the network 100. The agent 120 joins the network via the controller 110, and enables other devices to connect via proxy. As shown in the diagram, the multi-links connection comprises a 2.4 GHz frequency band, a 5 GHz frequency band, and a 6 GHz frequency band. Association is only over one link, which also contains information about the other links, although all links can be used for data transport. Priority traffic is typically sent over the 6 GHz frequency band, as this is typically a better or best affiliated link according to the TID mapping.

As shown in the diagram, both the MLO controller 110 and the MLO agent 120 include a number of virtual APs, which host a basic service set identifier (BSSID), and enable communication over the multi-links. In addition, the MLO controller 110 comprises a processing unit 115, a memory 117, and a communications unit 113. The communications unit 113 comprises a transceiver and antenna (not shown), which are used to transmit and receive data and instructions from other devices in the mesh network. The memory 117 stores data and instructions for use by the processing unit 115. The processing unit 115 can be a CPU, and is used to execute instructions stored in the memory 117. The processing unit 115, memory 117 and communications unit 113 can be coupled by means of a bus (not shown).

Initially, the controller configures the associated thresholds for a number of parameters, and sends these to all agents within the network for monitoring. These parameters include link quality measurements (such as RSSI) used to determine whether a link is operating at optimal or sub-optimal performance. A first threshold configured by the controller is a minimum Received Signal Strength Indicator (RSSI) threshold for link usage operation, which is the minimum RSSI at which a link can be used to send traffic. A second threshold is the Packet Error Rate (PER), and a third threshold is the Link Rate. These parameters are used when a new link needs to be evaluated, resulting in a change in traffic identifier (TID) mapping. A fourth threshold is a channel utilization (CU) threshold per frequency band.

The agent monitors the associated parameters. If RSSI of an operating band goes below the threshold, this indicates that the link has become sub-optimal. In addition, CU of a particular frequency band exceeding the threshold also indicates the link has become sub-optimal. If RSSI, PER and Link Rate all equal or go above their respective thresholds, this indicates that a previously sub-optimal link has become optimal, and the controller must perform further evaluation.

In addition, the controller also configures the following parameters:

RSSI/PER/Rate evaluation duration, which is the length of time for which the above parameters are evaluated for a new link. This can be configurable for about 60 seconds.

Default TID to link mapping per agent, which will be applied whenever a link is created.

Number of confirmation attempts when any parameter exceeds the set threshold. The number can be set to be more than one to confirm that this is a definite change in channel quality rather than a transient event.

One skilled in the art will understand that said parameters and thresholds can be set according to a desired network quality and may be configured by the engineer or designer.

The following will present a number of scenarios illustrated by FIGS. 2A~4C. The objective is for the controller to swiftly and efficiently switch the link association when channel conditions are deemed to be sub-optimal.

Figure 2A:
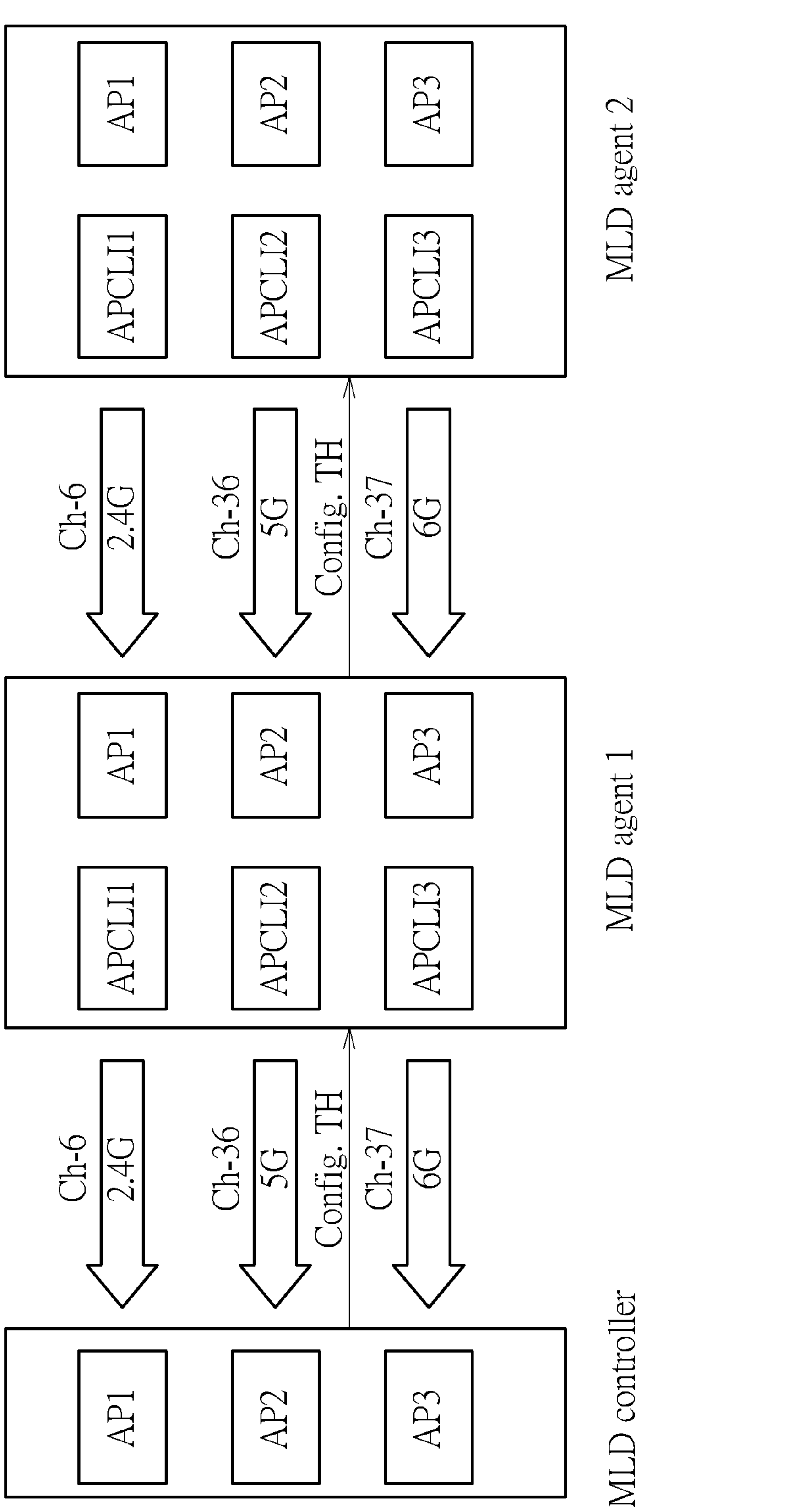
FIG. 2A is a diagram of a first step of a method according to a first embodiment of the present invention.

Refer to FIG. 2A, which illustrates a multi-link device (MLD) controller, an MLD agent 1 and an MLD agent 2 within a mesh network. The MLD agent 1 acts as a proxy agent for MLD agent 2. As shown in the diagram, connection is on the 2.4 GHz band, the 5 GHz band and the 6 GHz band. Typically, association is on the 6 GHz band for priority traffic. The controller configures a threshold and sends this parameter to the MLD agent 1. The MLD agent 1 can, in turn, pass this parameter (configured threshold) to MLD agent 2.

The TID is represented as a four-bit number (0~7) identifying the desired quality of service (QoS) for the traffic. In multi-link operations, the TID is used to determine which link(s) to use for traffic with a specific QoS, wherein a specific TID being mapped to a set of links means that any link within that set can be used to transmit data from that TID. After multi-link setup to a default/initial TID, the TID-to-link mapping can be updated. In addition, a TID can be mapped to a set of multiple links, allowing traffic with that TID to be transmitted using any link in this set.

Figure 2B:
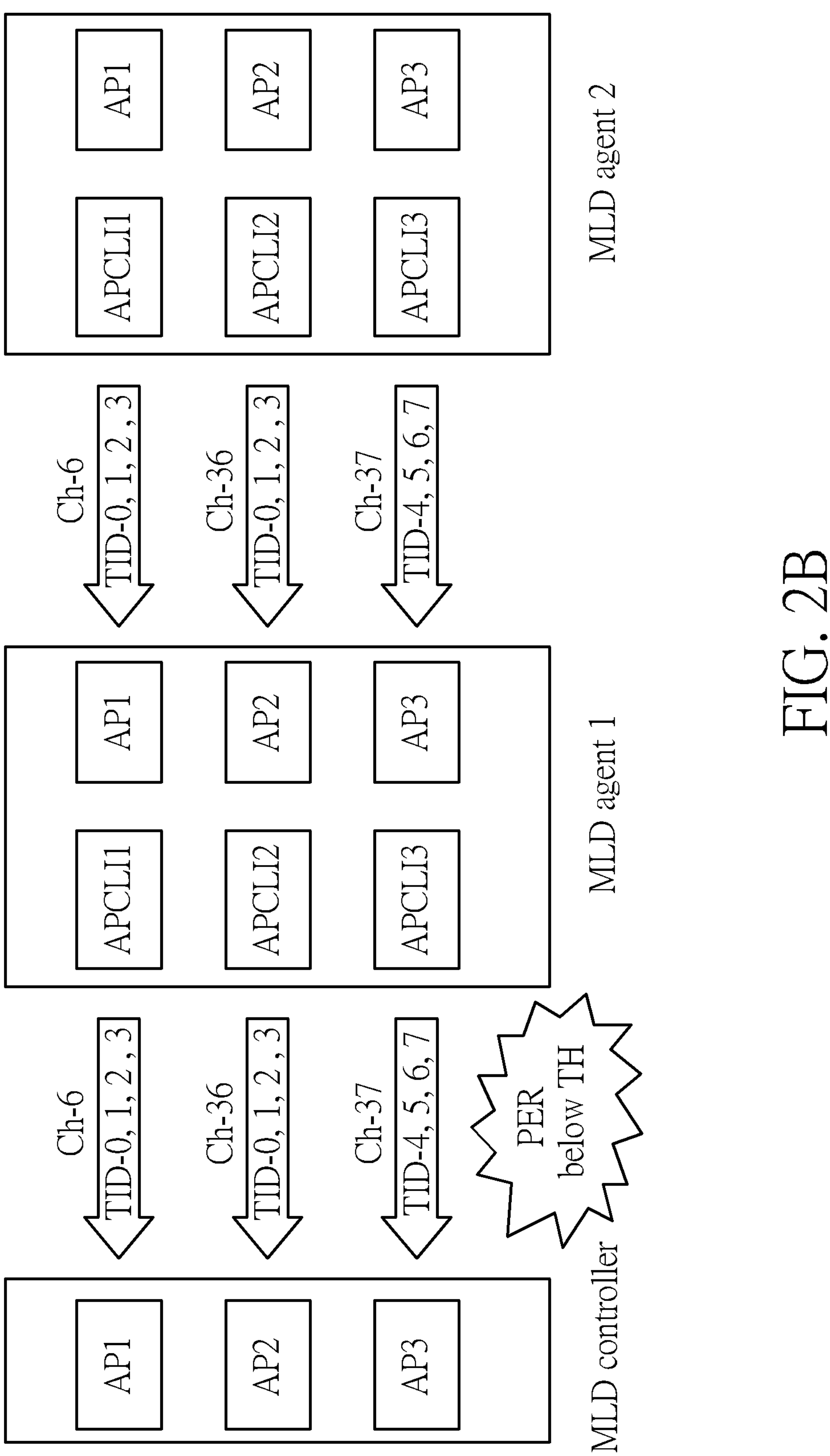
FIG. 2B is a diagram of a second step of a method according to the first embodiment of the present invention.

As shown in FIG. 2B, the TID to link mapping for the 2.4 GHz and the 5 GHz bands are 0,1,2,3, which is low priority traffic, whereas the TID to link mapping for the 6 GHz band is 4,5,6,7, which is high priority traffic. The measured RSSI on the 6 GHz band falls below the threshold, and the MLD agent 1 informs the controller. The MLD agent 1 also sends the latest PER and Link Rate values to the controller.

Figure 2C:
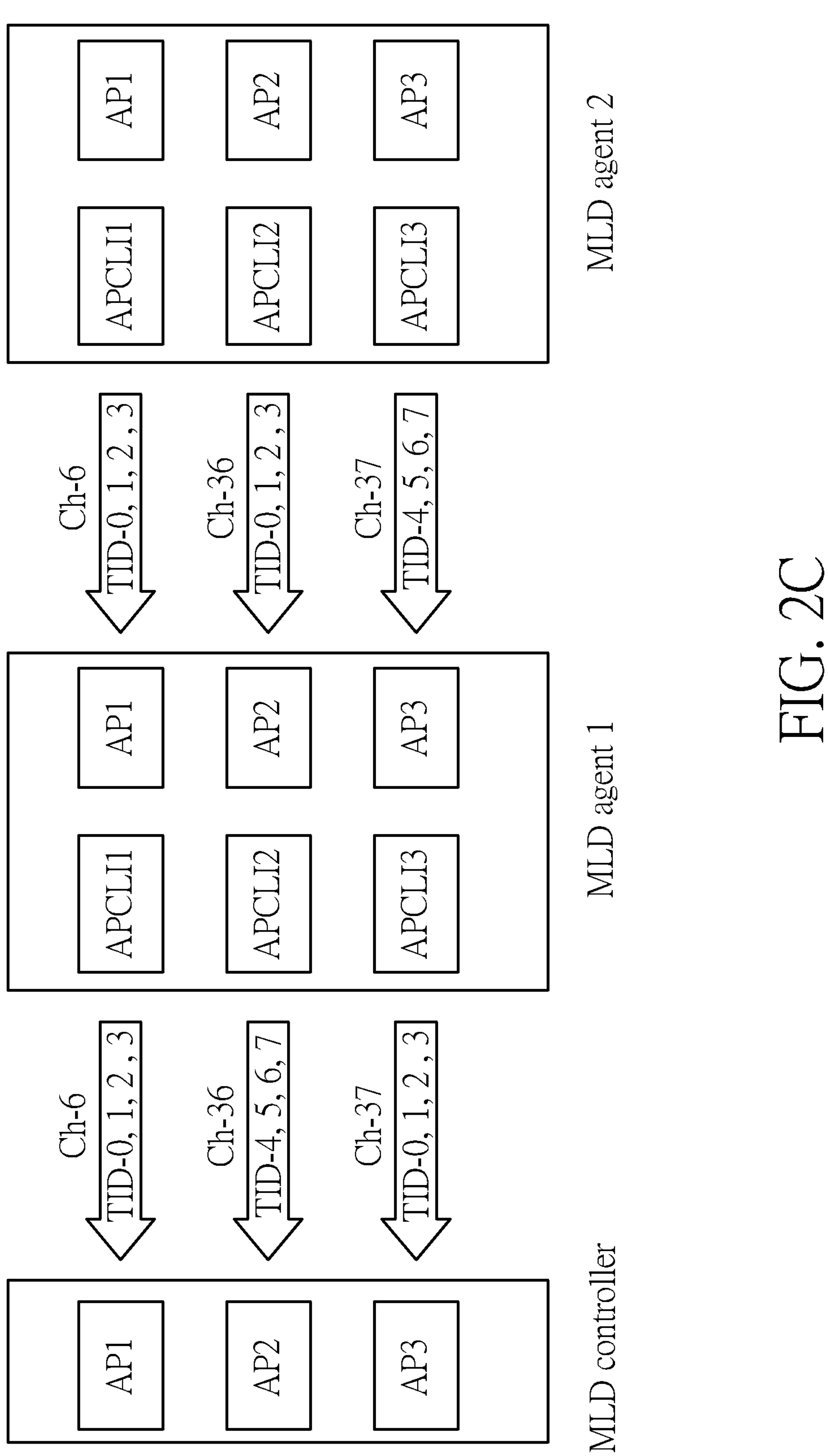
FIG. 2C is a diagram of a third step of a method according to the first embodiment of the present invention.

In response to receiving the notification that the RSSI on the 6 GHz band has fallen below the configured threshold, the controller first disables the 6 GHz link so that no traffic is sent via this frequency band. Using the latest PER and Link Rate values received from the MLD agent 1, the controller determines the priority of the better or best links. In this example, the priority is 5 G>2.4 G>6 G. As the 5 GHz link is the better or best affiliated link with the highest sustainable rate according to the PER and Link Rate measurements, high priority traffic will be mapped to this link, while low priority traffic will be sent on the other links. The new TID to link mapping, including the better or best affiliated link, will then be supplied to the MLD agent 1, as shown in FIG. 2C.

Figure 3A:
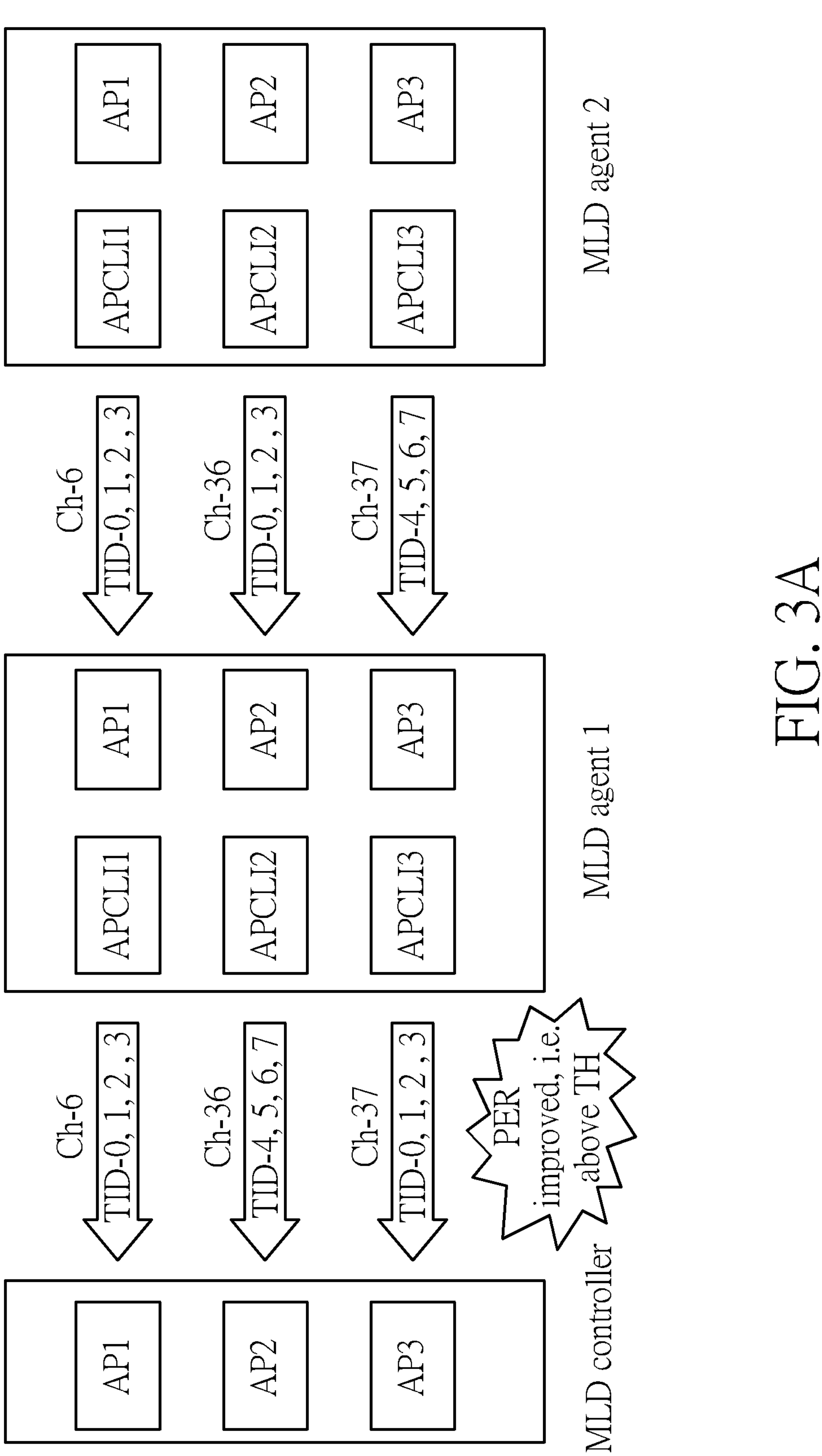
FIG. 3A is a diagram of a first step of a method according to a second embodiment of the present invention.
Figure 3B:
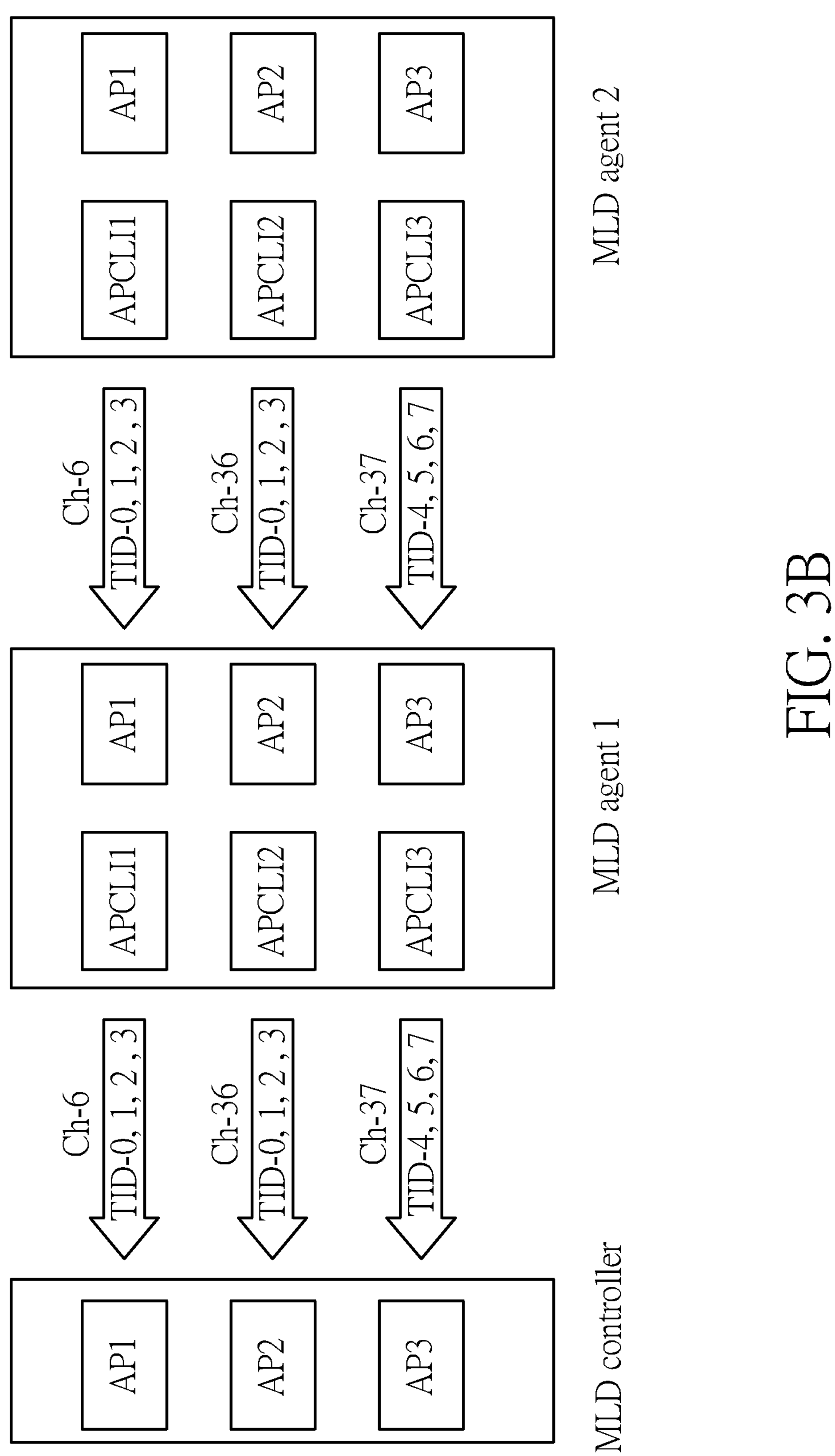
FIG. 3B is a diagram of a second step of a method according to the second embodiment of the present invention.

It is desirable for the mesh network to operate on the highest frequency band for priority traffic; therefore, the controller instructs the MLD agent 1 to continue to monitor parameters on all links. Refer to FIG. 3A. Although there is no change in association, due to the 6 GHz band becoming sub-optimal, the link for sending priority traffic is modified to be the 5 GHz frequency band. When the MLD agent 1 determines that the RSSI of the 6 GHz band has improved to be above the configured threshold, the controller will map low priority traffic to the 6 GHz link to perform evaluation. As detailed above, the controller sets an RSSI/PER/Rate evaluation duration as well as a number of confirmation attempts. The MLD agent 1 also sends updated PER and Link Rate values, so the controller can identify the priority of better or best links. As shown in FIG. 3B, the new priority is 6 GHz>5 GHz>2.4 GHz; therefore, high priority traffic is mapped to the 6 GHz frequency band. The controller then provides the MLD agent 1 with the new TID to link mapping. If no better link is found, there will be no change in the TID to link mapping.

The above steps will be repeated for each agent within the mesh network, and performed in a sequential manner.

Figure 4A:
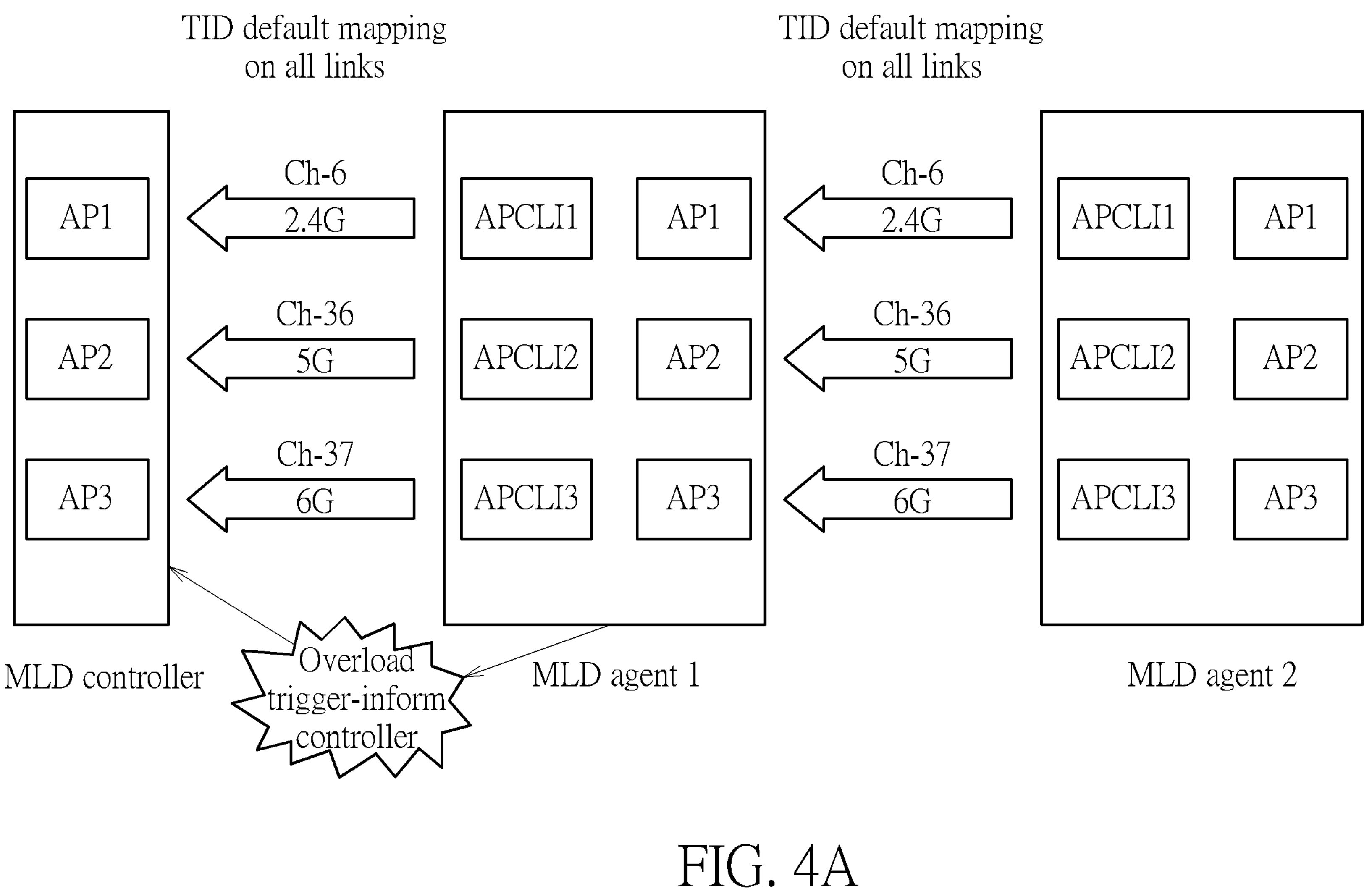
FIG. 4A is a diagram of a first step of a method according to a third embodiment of the present invention.
Figure 4B:
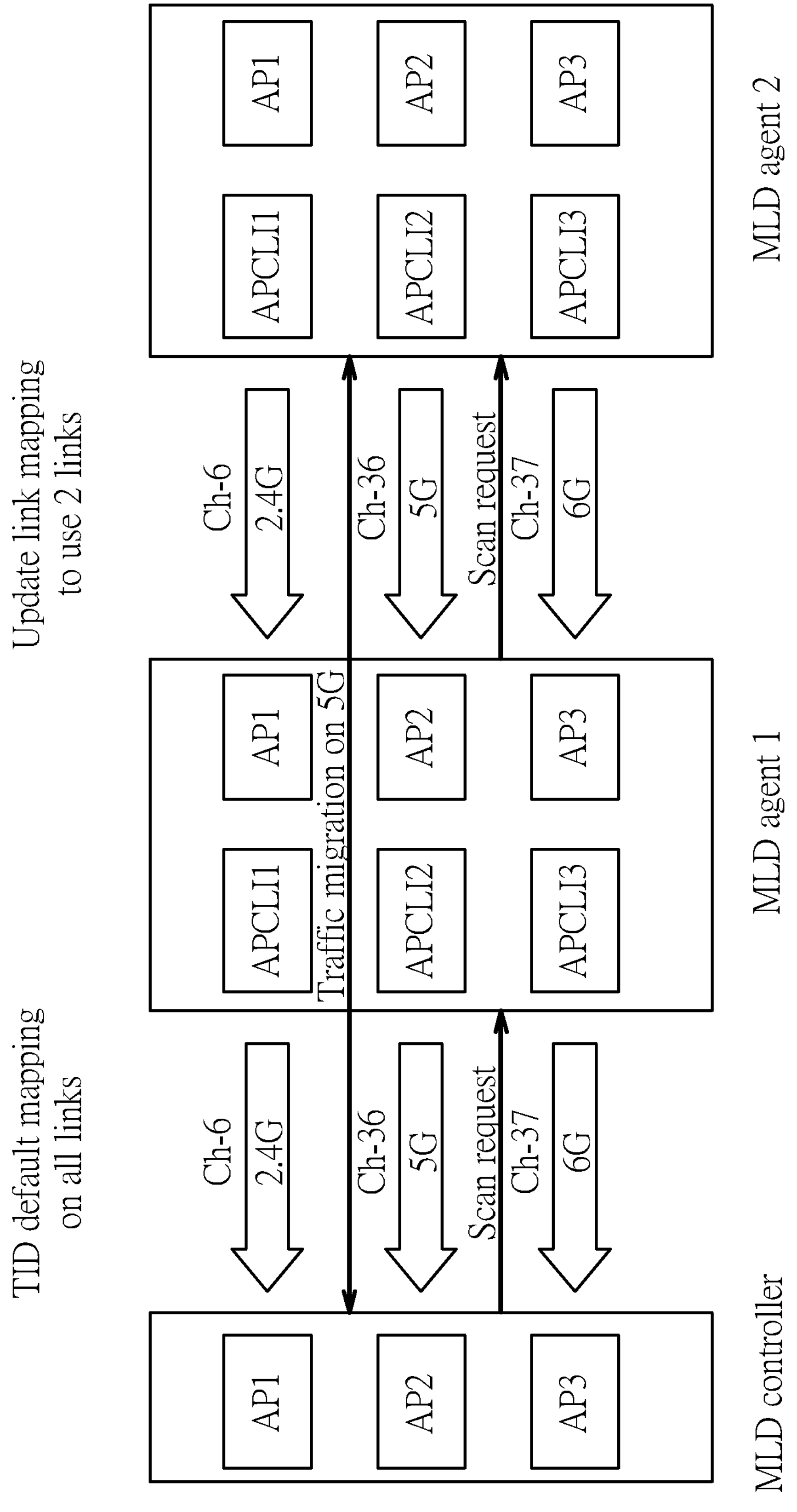
FIG. 4B is a diagram of a second step of a method according to the third embodiment of the present invention.

Refer to FIG. 4A, which illustrates channel overload. The agent informs the controller when channel overload occurs on at least one of the links. In response to this notification, the controller will send a scan request to the MLD agent 1. The MLD agent will disable all traffic on the highest frequency band for which a scan request is received so that scanning can be performed on this band, and will divert the traffic to other available links, as shown in FIG. 4B. This allows scanning to be performed in parallel with data traffic. Note that the MLD agent 2 will also stop traffic on the frequency band when the channel overload occurs as well as perform scanning.

Figure 4D:
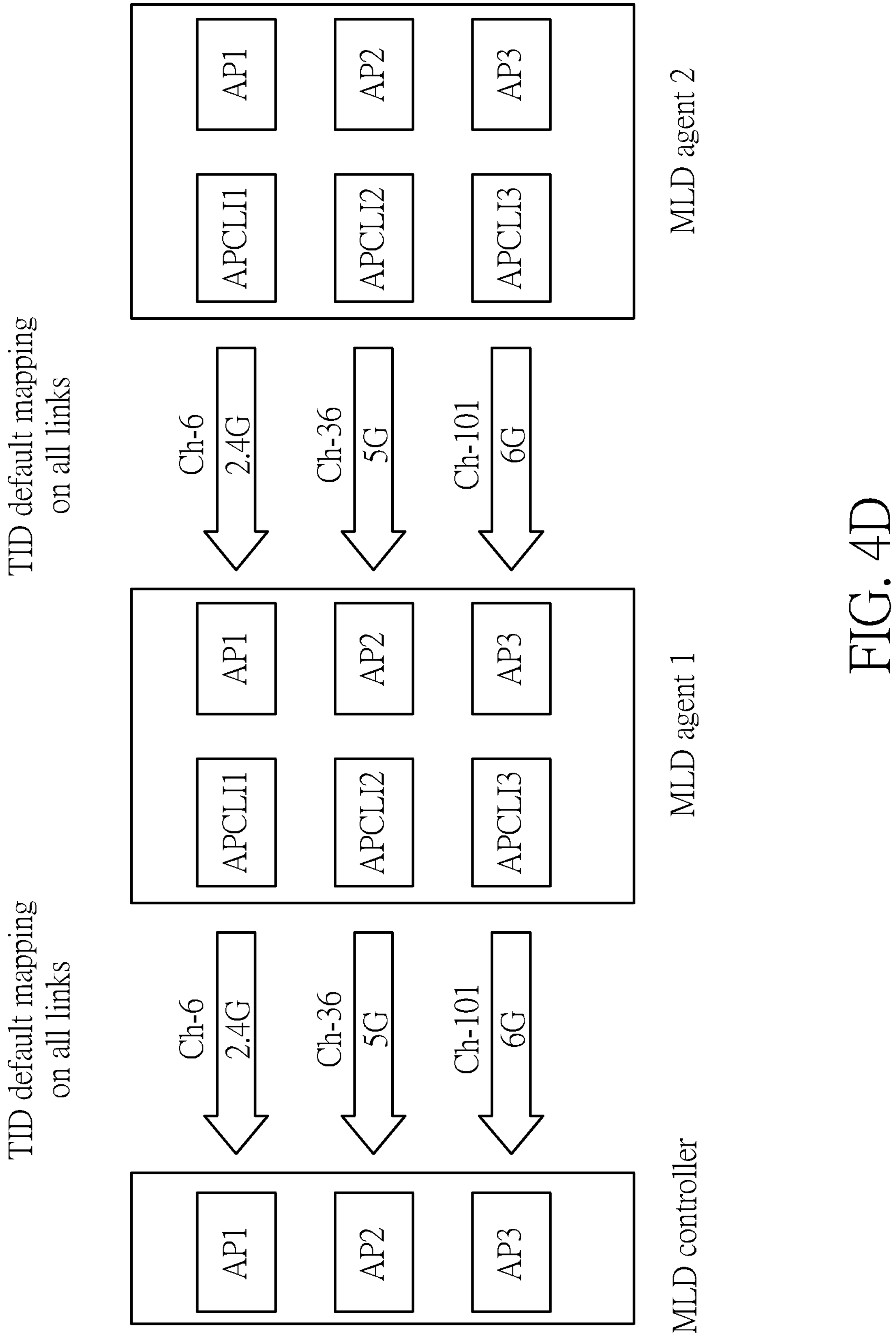
FIG. 4D is a diagram of a fourth step of a method according to the third embodiment of the present invention.

Upon receiving the scanning results, as well as other parameters measured by the agent, the controller can determine a better or best channel, and then switch to the better or best channel for the overloaded frequency band, as shown in FIG. 4C. Priority traffic is thereby directed to the better or best channel according to the scan results. If no better channel is found, the controller can perform the Traffic Distribution based on PER and Link Rate, as detailed previously. The controller continues to monitor the parameters on all links. Once CU has dropped below the threshold, and PER and Link Rate are also at or above the threshold, default TID to link mapping (i.e. high priority traffic on the 6 GHz frequency band) can be restored, as shown in FIG. 4D.

If there are other overloaded bands, the controller can perform the above steps for these bands. Scanning will be performed sequentially for all overloaded bands, starting from the highest frequency band.

In this way, the controller of the mesh network can quickly and efficiently perform traffic distribution when operating parameters change with respect to a configured threshold.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-link operation (MLO) controller for a mesh network, comprising:

a processing unit, for controlling operations of the mesh network, comprising:

establishing a multi-link connection with at least a first non-access (AP) point MLO device within the mesh network according to an initial traffic identifier (TID) to link mapping and a channel list, wherein the multi-link connection includes an associated link containing information of all other links, and priority traffic is sent on a better or best affiliated link configured by the TID to link mapping;

configuring a plurality of thresholds for a respective plurality of operating parameters of the multi-links;

when at least one of the operating parameters changes with respect to the configured threshold, disabling traffic on the corresponding link; and performing traffic distribution according to updated operating parameters and updating the TID to link mapping for the multi-link connection, comprising:

determining a priority of all links; and directing priority traffic to the highest priority link; and a communications unit, for transmitting the configured thresholds to the first non-AP MLO device, receiving a notification from the first non-AP MLO device when the operating parameter changes, and sending the updated TID to link mapping to the first non-AP MLO device;

wherein the operating parameter is a received signal strength indicator (RSSI) and when the RSSI goes below the configured threshold, the processing unit determines the priority of all links according to updated packet error rate (PER) and Link Rate values of the multi-links.

2. The MLO controller of claim 1, wherein when the RSSI of the disabled link equals or goes above the configured threshold, the processing unit further implements the instructions of:

mapping low priority traffic to the disabled link for evaluation;

when the disabled link is determined to be optimal, enabling the link; and updating the TID to link mapping.

3. The MLO controller of claim 2, wherein the processing unit further configures a duration time for evaluating RSSI, PER and Link Rate, and a number of confirmation attempts for determining the RSSI exceeds the configured threshold, and the disabled link is determined to be optimal according to the configured duration time and number of confirmation attempts.

4. The MLO controller of claim 1, wherein when the determined priority of all links indicates that the disabled link has the highest priority, the processing unit enables the disabled link for priority traffic.

5. The MLO controller of claim 1, wherein the operating parameter is channel overload (CU), and when the CU for a specific link of the multi-links goes above the configured threshold, the processing unit implements instructions of:

triggering scanning on the specific link, comprising:

diverting traffic to the other links; and initiating scanning on the specific link;

wherein when the scan results indicate there is a better or best channel, priority traffic is directed to the better or best channel, and when the scan results indicate that there is no better or best channel, the priority of all links is determined according to updated packet error rate (PER) and Link Rate values of the multi-links, and the priority traffic is directed to the highest priority link.

6. The MLO controller of claim 1, wherein the multi-links comprise a 6 GHz frequency band, a 5 GHz frequency band and a 2.4 GHz frequency band, wherein priority traffic is sent on the 6 GHz frequency band.

7. The MLO controller of claim 5, wherein the processing unit further implements the instructions of:

monitoring CU, PER and Link Rate of all links; and when the CU goes below the associated threshold and the PER and Link Rate equal or exceed their associated threshold, restoring the TID to link mapping to the initial mapping.

8. The MLO controller of claim 1, wherein the mesh network further comprises a second non-AP MLO agent, and the MLO controller is configured to operate with the second non-AP MLO agent via the first non-AP MLO agent.

9. A multi-link operation (MLO) method for a controller within a mesh network, comprising:

establishing a multi-link connection with at least a first non-access (AP) point MLO device within the mesh network according to an initial traffic identifier (TID) to link mapping and a channel list, wherein the multi-link connection includes an associated link containing information of all other links, and priority traffic is sent on a better or best affiliated link configured by the TID to link mapping;

configuring a plurality of thresholds for a respective plurality of operating parameters of the multi-links;

when at least one of the operating parameters changes with respect to the configured threshold, disabling traffic on the corresponding link; and performing traffic distribution according to updated operating parameters and updating the TID to link mapping for the multi-link connection, comprising:

determining a priority of all links; and directing priority traffic to the highest priority link;

wherein the operating parameter is received signal strength indicator (RSSI), and the method further comprises:

when the RSSI goes below the configured threshold, determining a priority of all links according to updated packet error rate (PER) and Link Rate of the multi-links.

10. The method of claim 9, wherein when the RSSI of the disabled link equals or goes above the configured threshold, the method further comprises:

mapping low priority traffic to the disabled link for evaluation;

when the disabled link is determined to be optimal, enabling the link; and updating the TID to link mapping.

11. The method of claim 10, wherein the step of determining the disabled link to be optimal comprises configuring a duration time for evaluating RSSI, PER and Link Rate, and a number of confirmation attempts for determining the RSSI exceeds the configured threshold, and the disabled link is determined to be optimal according to the configured duration time and number of confirmation attempts.

12. The method of claim 9, wherein when the determined priority of all links indicates that the disabled link has the highest priority, the method further comprises:

enabling the disabled link for priority traffic.

13. The method of claim 9, wherein the operating parameter is channel overload (CU), and when the CU for a specific link of the multi-links goes above the configured threshold, the method further comprises:

triggering scanning on the specific link, comprising:

diverting traffic to the other links; and initiating scanning on the specific link;

wherein when the scan results indicate there is a better or best channel, priority traffic is directed to the better or best channel, and when the scan results indicate that there is no better or best channel, the priority of all links is determined according to updated packet error rate (PER) and Link Rate values of the multi-links, and the priority traffic is directed to the highest priority link.

14. The method of claim 9, wherein the multi-links comprise a 6 GHz frequency band, a 5 GHz frequency band and a 2.4 GHz frequency band, wherein priority traffic is sent on the 6 GHz frequency band.

15. The method of claim 13, further comprising:

monitoring CU, PER and Link Rate of all links; and when the CU goes below the associated threshold and the PER and Link Rate equal or exceed their associated threshold, restoring the TID to link mapping to the initial mapping.

16. The method of claim 9, wherein the mesh network further comprises a second non-AP MLO agent and the method comprises configuring the MLO controller to operate with the second non-AP MLO agent via the first non-AP MLO agent.

* * * * *